Sept. 9, 1969  G. S. KIESTER ET AL  3,465,646
PNEUMATIC MOTOR STRUCTURE
Filed Oct. 5, 1967  3 Sheets-Sheet 1

INVENTORS.
GEORGE S. KIESTER
R STANFORD SHORT

BY *Bair, Freeman & Molinare*
ATTORNEYS.

Sept. 9, 1969    G. S. KIESTER ET AL    3,465,646
PNEUMATIC MOTOR STRUCTURE

Filed Oct. 5, 1967    3 Sheets-Sheet 2

INVENTORS.
GEORGE S. KIESTER
R STANFORD SHORT

BY Bair, Freeman & Molinare
ATTORNEYS.

Sept. 9, 1969  G. S. KIESTER ET AL  3,465,646
PNEUMATIC MOTOR STRUCTURE
Filed Oct. 5, 1967  3 Sheets-Sheet 3

INVENTORS.
GEORGE S. KIESTER
R STANFORD SHORT
BY *Bair, Freeman & Molinare*
ATTORNEYS.

United States Patent Office 3,465,646
Patented Sept. 9, 1969

3,465,646
PNEUMATIC MOTOR STRUCTURE
George S. Kiester and R. Stanford Short, Bryan, Ohio, assignors to The Aro Corporation, Bryan, Ohio, a corporation of Delaware
Filed Oct. 5, 1967, Ser. No. 673,212
Int. Cl. F01c 1/00
U.S. Cl. 91—121                                10 Claims

ABSTRACT OF THE DISCLOSURE

The specification discloses an improved motor and valving assembly for fluid-powered automatic tools particularly useful for driving screws or the like into precision assembly components. A cylinder insert has an eccentric bore which receives a rotor having axially slidable vanes or blades therein. The power fluid porting to and from the motor is through the end plates. A reversing valve assembly in communication with the ports is provided. An alternative embodiment discloses provision for cooling the cylinder exterior.

---

This invention relates to an automatic power tool such as a screw driver particularly designed for driving screws or the like into precision assembly components. In particular, the invention disclosed deals with an improved motor and valving assembly for air-powered automatic power tools.

It is among the objects of this invention to provide a simple, economical construction of an air-powered motor for ease of manufacture and ease of maintenance.

It is another object of this invention to provide a reliable air-powered motor of maximum power and long life, yet which is able to be constructed to fit in present power tools of this type.

With these and other objects in view, our invention consists in the construction, arrangement and combination of the various parts of our shut-off tool, whereby the objects above contemplated are attained, as hereinafter more fully set forth, pointed out in our claims and illustrated in detail in the accompanying drawings wherein:

Figure 1:
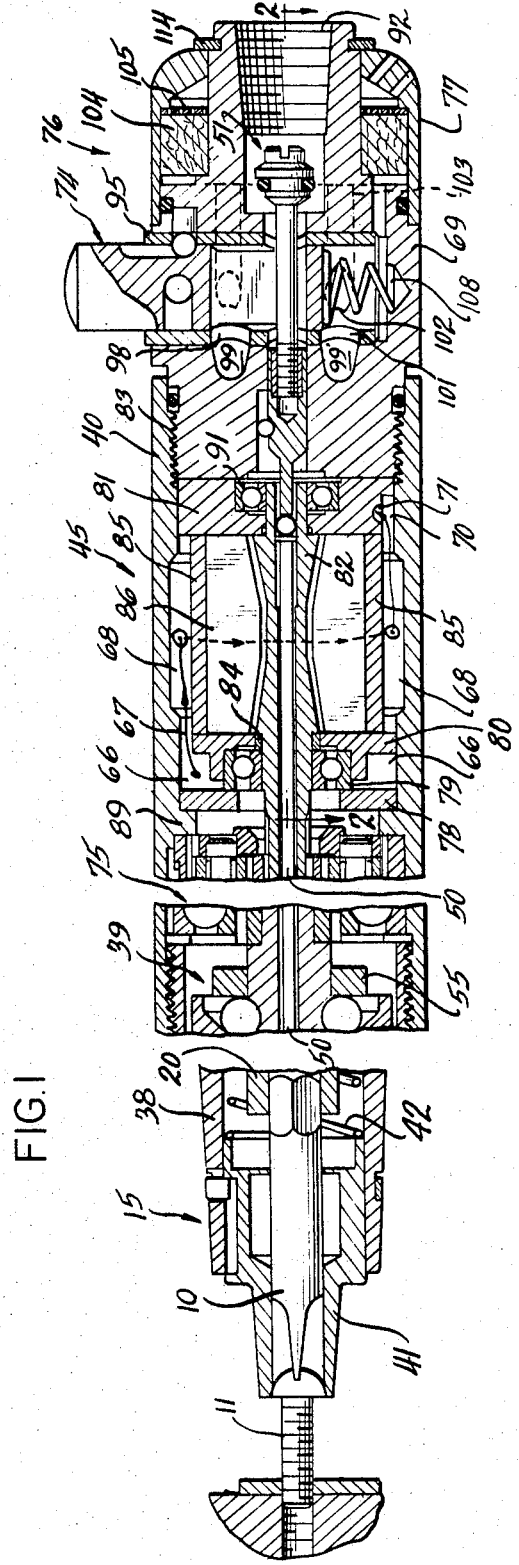
FIG. 1 is an enlarged longitudinal sectional view through an automatic power tool embodying the motor of our invention and showing the parts in normal position, but with the omission of conventional intermediary clutch and gearing portion.

In the accompanying drawings, similar parts are labeled identically throughout. The tool consists of five basic assemblies: Toolholder assembly 15, clutch assembly 39, gearing assembly 75, motor assembly 45, and power head 76.

The reference numeral 10 indicates a driven tool element such as a screw driver bit. The bit 10 is removably held in a sleeve-like bit holder 20 located within housing 38 which is connected to a pneumatic motor housing 40. Within the forward end of the housing 39 (left-hand end in FIG. 1) is slidably mounted a finder sleeve 41 backed by a spring 42. The bit holder 20 is part of a spindle 55 which is driven by the motor assembly within housing portion 40 through clutch assembly 39. The clutch may be any conventional clutch such as the non-impacting jaw clutch that cams into partial disengagement upon predetermined torque disclosed in U.S. Patent 3,289,715. The particular clutch and motor shut-off assembly shown in FIG. 1 is not a part of this invention and is disclosed and claimed in co-pending application Ser. No. 673,201, filed Oct. 5, 1967, concurrently herewith.

The speed of the motor contained within housing 40 is reduced to an operative bit-driving speed through a planetary gear assembly, indicated at 75. Since the reducing gears are conventional, such as shown in U.S. Patent 3,289,715, the precise details of the gearing are not shown.

Figure 2:
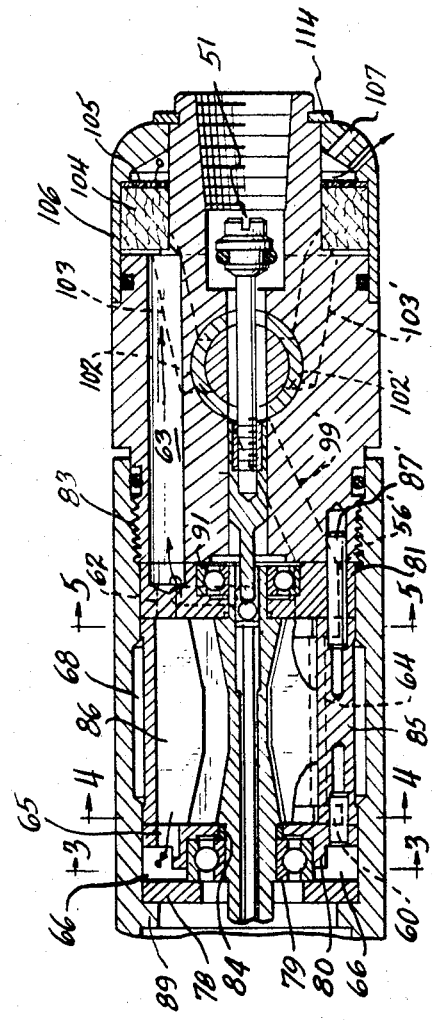
FIG. 2 is an enlarged longitudinal sectional view of the bottom half of the tool showing the valving head and motor assembly taken along line 2—2 of FIG. 1, the orientation being 90° to that of FIG. 1.
Figure 6:
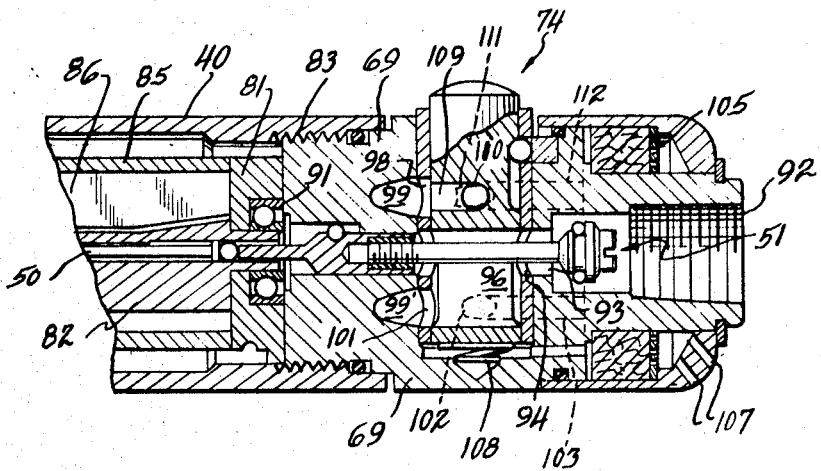
FIG. 6 is an enlarged longitudinal sectional view of the head assembly showing the reversing valve in the down (reverse) position, the orientation being as in FIG. 1.
Figure 7:
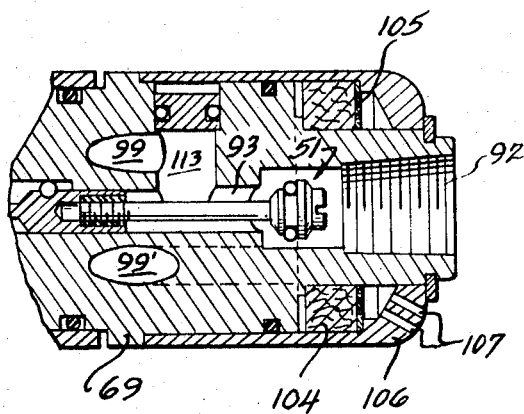
FIG. 7 is an enlarged longitudinal sectional view of the head assembly showing the porting for a uni-directional motor of our invention.

The fifth basic assembly of the tool is the power head unit shown generally at 76, and which consists of ported head 69, reversing valve 74 and throttle valve 51. The construction illustrated in FIGS. 1, 2 and 6 is one in which the motor is reversible, but uni-directional models are contemplated. As shown in FIG. 7, uni-directional rotation of the motor is achieved by using a fixed plug to replace the reversing valve assembly 74 of FIGS. 1, 2 and 6, with appropriate porting being provided. Alternatively, appropriate end plates and heads could be employed to alter the porting pattern to result in a uni-directional rotation.

A summary of the operating sequence is as follows. The operator engages the bit 10 to the fastener to be driven 11, and exerts thrust against the fastener. The thrust is transferred through rod 50 to unseat the throttle valve 51. Air is admitted through the throttle valve 51 and passes through reversing valve 74 and thence through the head 69 into the motor. Exhaust air is ported from the motor through the head 69 into the muffler 77 and out to atmosphere. The motor rotation is transmitted through planetary gear reduction assembly 75, through the clutch assembly 39 to drive the bit 10. When the fastener provided resistance to rotation of the clutch assembly 39, the clutch responds and releases the rod 50 which is then free to move forward due to incoming air exerting pressure on the throttle valve 51. The throttle valve reseats and terminates the flow of the air to the motor, thus stopping the tool. The details of operation of the clutch and shut off mechanism 39 of the tool are fully disclosed and claimed in copending application Ser. No. 673,201, filed concurrently herewith.

The gearing 75 is essentially conventional planetary reduction gearing. In a preferred embodiment, the planet gear carriers provide mounting for three planet gears by a shallow recess on one side to accommodate one gear, and by a deep recess diametrically opposite to accommodate two planet gears. Strength and balance are retained in this construction. Both a single and double gear reduction construction is contemplated within the scope of this invention.

Referring in detail now to FIGURES 1–6, the motor housing 40 is provided with a cylindrical bore into which the motor components fit. Separating the gear compartment from the motor compartment is lip 89 against which retaining spaced 78 for bearings 79 and front end plate 80 are retained. The rotor 82 is positively spaced from the front end plate 80 to assure proper running clearance. This is accomplished by using a bearing 79 which has the races flush when thrust is applied, in conjunction with the proper proportioning of the thickness of spacer 84 and the front end plate 80. The bearing 79 is locked against the front end plate 80 by spacer 78 and the clamping action of the housing thread system 83. Thus, the bearing position is positively established. This is of importance since the air pressure and area dfferentials existing on the rotor 82 cause a constant bias on the rotor acting toward the bearing 79 which can effect a spacing condition at the front end plate 80.

Figure 4:
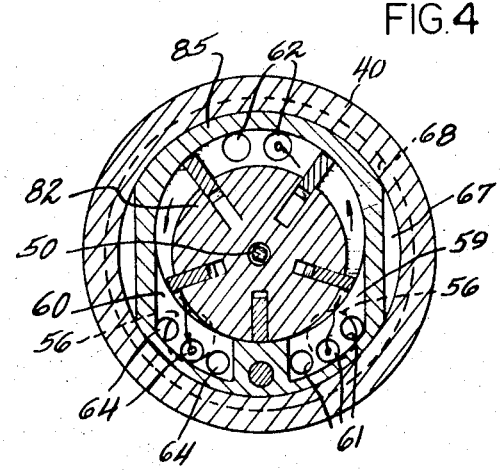
FIG. 4 is a cross-section of the forward end of the cylinder and rotor taken along line 4—4 of FIG. 2.

The rotor 82 contains a plurality of slots 88 (best seen in FIG. 4) for receiving radially slidable rotor blades 86. Any convenient number of blades may be used with a preferred embodiment employing five blades. The rotor and rotor blades operate within cylinder insert 85, the axis of the bore of which is off-set with respect to the axis of the bore in housing 40 and the axis of rotor 82. The rotor blades or vanes 86 thus reciprocate in their respective slots in the eccentric bore of the cylinder as the rotor rotates. As seen in FIG. 4, the vanes on the left side of the tool (upper two vanes in FIG. 4) are in their most extended position out of contact with the bottom of the slot 88, whereas the right hand vane (bottom vane in FIG. 4) is in the converse position, being fully slid into its rotor slot.

The cylinder 85 is positioned with respect to the front end plate 80 by the provision of pin 87, and is positioned with respect to the rear end plate 81 by pin 87' (FIG. 2). The rotor is designed just sufficiently shorter than the cylinder 85 to assure clearance between the rear of the rotor and the rear end plate 81. Rear bearing 91 centers the rotor in the rear end plate 81. Power is taken off the rotor at the left as seen in FIG. 2.

Figure 5:
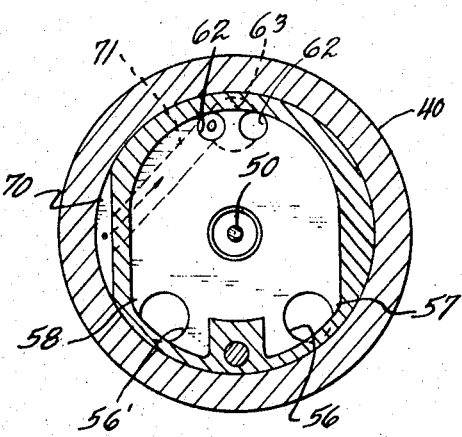
FIG. 5 is a cross-section of the rear end plate taken along line 5—5 of FIG. 2.

It can be seen that the cylinder insert 85 has no porting on its periphery, in contrast to prior art devices. In operation, air is admitted to the tool through the aperture 92 at the rear of the tool. When the throttle valve assembly 51 is unseated by the action of the bit 10 translated in a rearward axial movement through the rod 50, the air passes in succession through a hole 93 in head 69, thence through a corresponding hole 94 in valve bushing 95, and through a slot 96 in the body of reversing valve stem 74. Air then passes through upper hole 98 in valve bushing 95 and through upper diagonal duct 99 in the forward part of head 69 to the rear end plate 81. The upper duct or bore 99 is disposed diagonally from the central vertical plane of head 69 toward the left side of the instrument, when viewed from the top of the tool with the bit 10 pointing away, in an orientation identical to that of the lower duct 99' in FIG. 2. The forward end of duct 99 opens into upper hole 56 of the rear end plate 81 (FIG. 5). Air passing through upper hole 56 passes into a lower relieved portion 57 in the rear end of the cylinder 85 communicating therewith (FIG. 4), and thence to a corresponding relieved portion 59 in the forward end of cylinder 85 via three upper cylinder holes 61 (FIG. 4) axially parallel to the axis of the cylinder and tool. The motive air thus enters the cylinder from both ends simultaneously from the rear and front relieved portions 57 and 59 respectively to impinge on the vanes 86 to turn the rotor counter-clockwise as seen in FIG. 4.

Upon rotating approximately a half turn (from left to right viewing the instrument of FIG. 1 from the top), the air is exhausted out dual primary exhaust ports 62 in the rear end plate 81 (FIGS. 2, 4 and 5). The exhausting air then passes out primary exhaust duct 63 in the right side of the head 69 (FIG. 2) into the area between the head and end cap 106. A felt washer assembly 104 acts as a muffler, held in place by screen 105, within the end cap. The exhaust air then passes through holes 107 in end cap 106 secured to the head by ring 114.

As the rotor completes its rotation, air is secondarily exhausted through lower front relieved portion 60 (FIG. 4) communicating via lower cylinder holes 64 and lower rear end plate hole 56' with duct 99' (FIGS. 2 and 4), and through lower rear relieved portion 58 (FIG. 5) also through lower rear end plate hole 56' to duct 99'. As seen best in FIGS. 1 and 2, duct 99' opens through hole 101 in valve bushing 94 into the hollow bushing space. Air then passes through holes 102, 102' into lower auxiliary exhaust ducts 103, 103' to exhaust through the muffler 104 as before.

Figure 3:
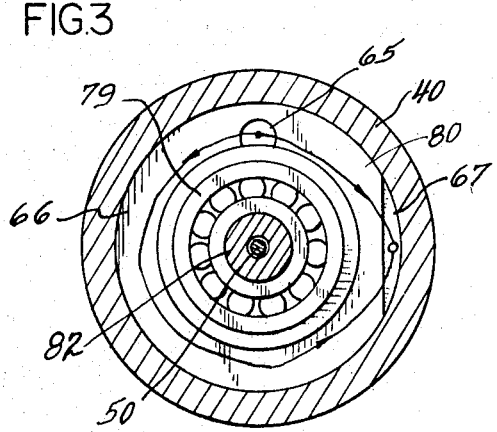
FIG. 3 is a cross-section of the forward end plate taken along line 3—3 of FIG. 2.

In an alternative embodiment, a cooling port 65 is provided in the forward end plate 80 on the right side of the tool (FIGS. 2 and 3). After having completed approximately half a revolution, air in the cylinder can exhaust forward through this cooling port (as well as primarily directly rearwardly through ports 62 and primary exhaust duct 63). The air may then circle around in space 66 from the right side to the top of the tool and pass via notch 67 in forward end plate 80 into annular cooling space 68 provided in housing 40 (FIGS. 1–3). The air then passes around the annular space cooling the cylinder 85 to the bottom of the tool, as best seen in FIG. 1. The heated cooling air then passes through notch 70 in rear end plate 81 (FIGS. 1 and 5) into bore 71 in the rear end plate communicating with primary exhaust ports 62. The heated air then passes out primary exhaust duct 63 to exhaust through muffler 104 as before.

As seen in FIG. 6, reversing is accomplished by pushing reverse valve 74 downwardly against the action of spring 108. Since there are no holes in reversing valve stem 74 corresponding to the holes 102, 102' in the valve bushing 95, the lower auxiliary exhaust ducts 103, 103' are closed off. The air enters through holes 93, 94 into the reversing valve slot 96 and thence into duct 99' in head 69 via bushing hole 101. The air then passes through duct 99', the lower hole 56' in the rear end plate 81 and thence into lower rear relieved portion 58 and via lower cylinder holes 64 to lower front relieved portion 60 in the cylinder 85 (FIGS. 2, 4 and 5). As before, the air impinges on vanes 86 from both ends of the cylinder simultaneously, turning the rotor clockwise (see FIG. 4). The primary exhausting operates as above described, after about one half revolution air exhausting via 62 and 63 to the muffler 104. Exhausting air can also operate to cool the cylinder as above described, leaving the rotor chamber via cooling port 65 at this point.

Secondary exhausting is the converse of the above described. Upon completing rotation, air is expelled through upper forward relieved portion 59, cylinder holes 61, upper rear relieved portion 57, upper hole 56 (FIGS. 4 and 5) into upper diagonal duct 99 and through upper hole 98 in valve bushing 95 (FIG. 6). In this lowered reversing position, the valve 74 exposes valve port 109 which communicates with two valve holes 110 and 110'. The bushing holes 111, 111' which are covered in FIG. 1, are exposed when the valve is in the position shown in FIG. 6, and the air can exhaust through the upper auxiliary exhaust ducts 112, 112' and thence outwardly through the muffler 104 and exhaust holes 107 in end cap 106 as before.

FIG. 7 shows an embodiment in which the head assembly 69 is so ported that the motor is uni-directional. Air enters past throttle valve asembly 51 through the hole 93 in head assembly 69 and thence into passage 113 to communicate via duct 99 to the motor cylinder. After impelling the vanes of the motor, the exhaust air passes via primary exhaust duct 63 as before (not shown), and via secondary exhaust duct 99' directly to muffler 104. Cooling may be provided as before, the heated cooling air passing directly out the primary exhaust duct 63.

Changes may be made in the construction and arrangements of the motor parts of our automatic shut-off tool without departing from the real spirit and purpose of our invention.

We claim as our invention:

1. A fluid powered motor assembly comprising
   (a) means defining a cylindrical stator having an axially parallel but offset bore therein,
      (1) the walls of said stator being imperforate, (b) a rotor coaxial with said stator means received in said bore, said rotor having a plurality of radial slots therein and being free to rotate, (c) blades disposed in said slots, (d) a first means defining an end plate disposed at one end of said stator perpendicular to the axis of said stator, (e) a second means defining an end plate disposed at the opposite end of said stator perpendicular to the axis of said stator, (2) said rotor and blades being disposed in said stator bore and journaled at each end in said end plate means, (3) said first end plate means having an inlet port and a secondary exhaust port provided therein and communicating with said bore, said inlet and secondary exhaust ports being positioned adjacent each other with respect to the direction of rotation of said rotor as it passes said secondary exhaust port moving toward said inlet port, (f) a primary exhaust port provided in one of said end plate means disposed about 180 rotational degrees from said inlet and secondary exhaust ports, whereby motive fluid is inlet and exhausted, both primarily and secondarily, through said end plate means.

2. A motor assembly as in claim 1 which includes in combination:

(a) means defining a power head disposed in communication with said first end plate and having inlet and exhaust ducts therein, (b) means defining a reversing valve assembly disposed in said power head, in communication with said inlet and secondary exhaust ports of said first end plate and with inlet and secondary exhaust ducts of said power head, whereby said motor can be controlled to rotate clockwise or counter-clockwise as desired upon actuation of said valve means.

3. A motor assembly as in claim 1 wherein:

said inlet and secondary exhaust ports in said first end plate are disposed offset with respect to said cylindrical stator bore, and said cylindrical stator bore has provided therein adjacent said first end plate a first pair of relieved portions communicating respectively with said inlet and secondary exhaust ports.

4. A fluid powered motor assembly comprising:

(a) means defining a cylindrical stator having an axially parallel but offset bore therein, (1) the walls of said stator being imperforate, (b) a rotor coaxial with said stator means received in said bore, said rotor having a plurality of radial slots therein, (c) blades disposed in said rotor slots, (d) means defining a first and a second end plate disposed at each end of said stator perpendicular to the axis of said stator, said rotor being journaled at each end therein, (2) said first end plate having an inlet port and a secondary exhaust port provided therein, disposed offset with respect to said cylindrical stator bore, (3) said cylindrical stator bore has provided therein adjacent said first end plate a first pair of relieved portions communicating respectively with said inlet and secondary exhaust ports, (4) said first end plate has a primary exhaust port provided therein disposed approximately 180 rotational degrees from said inlet and secondary exhaust ports, (e) means defining a power head disposed in communication with said first end plate and having inlet and exhaust ducts therein, (f) means defining a reversing valve assembly disposed in said power head, in communication with said inlet and secondary exhaust ports of said first end plate and with inlet and secondary exhaust ducts of said power head, whereby said motor can be controlled to rotate clockwise or counter-clockwise as desired upon actuation of said valve means, (5) said power head has a primary exhaust duct disposed therein communicating directly with the exterior of said assembly without passing through said reversing valve assembly, (6) said cylindrical stator bore has a second pair of relieved portions corresponding to said first pair provided adjacent said second end plate, and (g) bores communicating between said first and second relieved inlet portions and said first and second relieved secondary exhaust portions are disposed within the wall of said cylindrical stator, whereby motive fluid in inlet adjacent both ends of said stator and motive fluid is secondarily exhausted adjacent both ends of said stator.

5. A motor assembly as in claim 4 wherein:

said second end plate has a port provided therein disposed approximately 180 rotational degrees from the corresponding inlet and secondary exhaust ports, and which includes in combination:

(a) means for directing a portion of the motive fluid from the stator cavity around the exterior periphery of said cylindrical stator, whereby said motor assembly is cooled by motive fluid.

6. A motor assembly as in claim 5 wherein:

said first end plate has disposed therein a bore communicating between said exterior periphery and said primary exhaust port, whereby the cooling motive fluid exhaust directly to the exterior of the motor assembly via said primary exhaust duct.

7. A motor assembly as in claim 1 wherein said primary exhaust port is provided in said first end plate means.

8. A motor assembly as in claim 7 including:

(a) means defining a power head disposed in communication with said first end plate having inlet and exhaust ducts therein, one of said ducts being a primary exhaust duct disposed to communicate with said primary exhaust port and directly to the exterior of said assembly, whereby motive fluid is exhausted rearwardly of said assembly.

9. A motor assembly as in claim 7 wherein:

said second end plate has a port provided therein disposed approximately 180 rotational degrees from the corresponding inlet and secondary exhaust ports, and which includes in combination:

(a) means for directing a portion of the motive fluid from the stator cavity around the exterior periphery of said cylindrical stator, whereby said motor assembly is cooled by motive fluid.

10. A motor assembly as in claim 9 wherein.

said first end plate has disposed therein a bore communicating between said exterior periphery and said primary exhaust port, whereby the cooling motive fluid exhausts directly to the exterior of the motor assembly via said primary exhaust duct.

References Cited

UNITED STATES PATENTS

| | | | |
|---|---|---|---|
| 2,857,143 | 10/1958 | Kroeckel et al. | 91—121 |
| 2,964,151 | 12/1960 | Eckman | 91—59 |
| 3,190,183 | 6/1965 | Walker et al. | 91—121 |
| 3,232,173 | 2/1966 | Van Sittert et al. | 253—2 XR |
| 3,309,965 | 3/1967 | Weickgenannt | 253—3 XR |
| 3,398,644 | 8/1968 | Wetzel et al. | 91—138 |

EVERETTE A. POWELL, JR., Primary Examiner